United States Patent
Ejiri et al.

(10) Patent No.: US 6,366,360 B2
(45) Date of Patent: *Apr. 2, 2002

(54) METHOD AND A SYSTEM FOR CORRECTING DISTORTION ABERRATIONS IN HIGH RESOLUTION IMAGES

(75) Inventors: Koichi Ejiri, Narashino; Haike Guan; Shin Aoki, both of Yokohama, all of (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/807,571

(22) Filed: Feb. 27, 1997

(30) Foreign Application Priority Data

Feb. 27, 1996 (JP) ............................................. 8-039514
Oct. 16, 1996 (JP) ............................................. 8-273294

(51) Int. Cl.⁷ ............................................. G06F 15/00
(52) U.S. Cl. ............................................. 358/1.9; 359/649
(58) Field of Search ............................................. 382/141, 254, 382/275, 248, 251, 140, 321; 348/595, 705, 400, 218, 208; 250/201.8, 201.2, 204, 559.29, 221; 359/237–324, 618–830; 395/109

(56) References Cited

U.S. PATENT DOCUMENTS 4,895,431 A * 1/1990 Tsujiuchi et al. ........... 350/320
5,481,653 A * 1/1996 Kashiwagi .................. 395/100
5,668,595 A * 9/1997 Katayama ................... 348/218

FOREIGN PATENT DOCUMENTS

JP       3-242526       10/1991
JP       7-184154        7/1995

OTHER PUBLICATIONS

Kodama et al., Enhanced Image Acquisition by Using Differently Focused Multiple Images, ITE '95: 1995 ITE Annual Convention.

* cited by examiner

Primary Examiner—Joseph Mancuso
Assistant Examiner—Douglas Tran
(74) Attorney, Agent, or Firm—Knoble and Yoshida (57) ABSTRACT

The method and a system for determining coefficients correct distortion aberration based upon corresponding portions of partially overlapping images. These images are generally generated without any specific reference markers in the image for determining the distortion caused by an optical system.

26 Claims, 8 Drawing Sheets

| PARAMETER | SETTING |
|---|---|
| PIXEL PITCH xo, yo | FIXED |
| LENS FOCAL LENGTH f | FIXED |
| DISTORTED ABBERATION CORRECTION COEFFICIENTS | INITIALIZED |
| LENS IMAGE DISTANCE R | VARIABLE |
| FI VALUE | VARIABLE |
| $\gamma$-CONVERSION TABLE VALUE, IMAGE AMPLIFICATION VALUE | VARIABLE |
| AVERAGE COLOR VALUE DYNAMIC RANGE | VARIABLE |

METHOD AND A SYSTEM FOR CORRECTING DISTORTION ABERRATIONS IN HIGH RESOLUTION IMAGES

RELATED APPLICATION DATA

This application is related to pending U.S. patent application Ser. No. 08/966,889, filed Nov. 10, 1997 for METHOD AND SYSTEM FOR GENERATING A COMPOSITE IMAGE FROM PARTIALLY OVERLAPPING ADJACENT IMAGES TAKEN ALONG A PLURALITY OF AXES.

FIELD OF THE INVENTION

The current invention is generally related to a method and a system for correcting distortion aberration in images, and more particularly related to a method and a system for determining coefficients for correcting distortion aberration based upon corresponding portions of partially overlapping images.

BACKGROUND OF THE INVENTION

Figure 1:
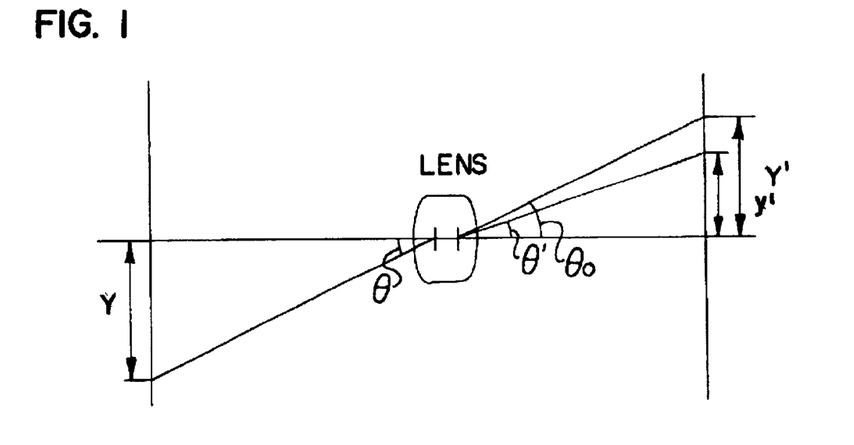
FIG. 1 diagrammatically illustrates distortion aberration of a lens.

An image generated by an optical lens is generally susceptible to distortion or aberration. The distortion aberration of a lens is inherent and roughly defined by a positional or geometric discrepancy between a generated image and a true object. In other words, a certain portion of the image generated by the lens does not reflect an original object. For example, a straight line in the original object is often curved in an image generated by a lens. To further define the distortion aberration, referring to FIG. 1, Y is an object placed before a lens, and θ is an incoming angle of the object Y. y' is a distortion image focused by the lens with an outgoing angle of θ'. Y' is an assumed true image without distortion with an angle $\theta_o$. The distortion aberration of the lens is defined either in terms of angle β or distance D as follows:

$$\tan(\theta')/\tan(\theta)=\beta \quad (1)$$

$$(y'-Y)/Y \cdot 100 = D \quad (2)$$

Figure 2A:
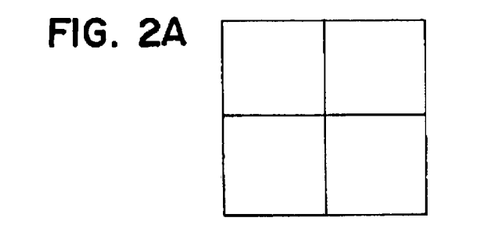
FIGS. 2A, 2B and 2C respectively illustrate an image rendered by a lens without distortion aberration, with distortion aberration D>0, and with distortion aberration D<0.
Figure 2B:
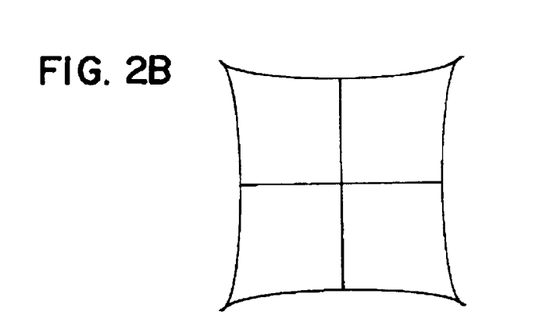
Figure 2C:
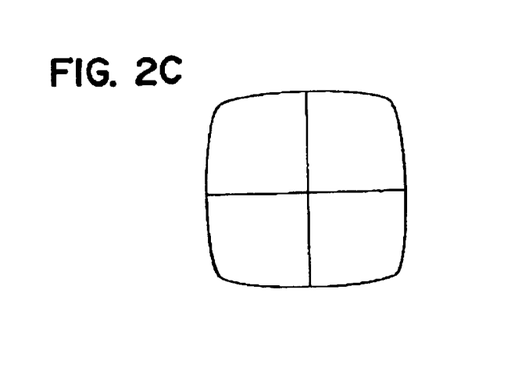

Now referring to FIG. 2, the effects of the distortion aberration are illustrated in terms of the above defined equations (1) and (2). FIG. 2A shows an original object, and FIGS. 2B and 2C respectively show an image formed by a lens which caused distortion aberration in the image. As θ in equation (1) increases and β decreases, the original lattice image is distortion like a barrel as illustrated in FIG. 2C. Similarly, as D in the equation (2) is negative, the barrel image is also formed. On the other hand, as θ in the equation (1) increases and β also increases, the original lattice image is distortion like a spool as illustrated in FIG. 2B.

Similarly, as D in the equation (2) is positive, the spool image is also formed. In other words, the distortion aberration of a lens causes portions of an image to be variably affected depending upon a distance from the optical center of the lens. To correct the image, certain lenses have been designed to compensate for the distortion. However, such lens design efforts are generally limited in solving the problem due to advanced features such as zooming and auto-focusing of the optical systems.

Digital processing of the images is more efficient in correcting distortion aberration than lens design efforts. One digital processing technique in correcting a distortion image is to initially determine an amount of distortion in a known image such as a lattice or a test pattern which is taken by an optical system in question. A comparison between the known image and the distortion image yields a distortion amount, and an appropriate distortion correction factor is subsequently determined. In a similar approach, a known straight line in a distortion image is selected, and the distortion line is used to determine the above described distortion amount. Another digital processing technique in correcting a distortion image involves the use of reference markers or control points on a three-dimensional object. Instead of using the above described two-dimensional lattice, the known reference markers are imaged, and the geometric relation of the markers is digitally corrected according to the known marker positions.

In the above described approaches, a series of the images must be generated with reference markers such as a lattice. In other words, the images without the reference markers are not generally suitable for digital correction of distortion. The placement of the reference markers is tedious since the image with the markers must be generated for each particular use of the lens such as a particular zoom distance. Furthermore, the marker placement is not always feasible or practical. For example, when the object is a distant scenery. Another example is old existing images which are recorded by a device that is no longer available. For these reasons, the use of reference markers is not always practical or feasible.

The distortion aberration is especially problematic for high-resolution wide angle images. Such images include panoramic images and aerial photographs. Since a series of partially overlapping images is taken and later composed into a single image, the distortion portions of the images especially near edges must be corrected prior to joining the edges of the images.

SUMMARY OF THE INVENTION

In order to solve the above and other problems, according to one aspect of the current invention, a method of correcting distortion aberration in images taken by a common optical system, includes: a) taking at least partially overlapping images of an object, the images containing a common element; b) determining correction coefficients based upon a relationship between corresponding pairs of information representing the common element in the images; and c) correcting distortion aberration in the images according to the correction coefficients.

According to a second aspect of the current invention, method of correcting distortion aberration in images taken by a common optical system, includes: j) determining a correction coefficient based upon a relationship between corresponding pairs of information on a common element in the images, the images being at least partially overlapping to contain the common element; k) correcting distortion aberration in the images according to a predetermined correction function using the correction coefficient; and l) joining the corrected images so as to generate a composed single image.

According to a third aspect of the current invention, a system for correcting distortion aberration in images, includes: an optical unit having an optical axis for focusing upon an object and generating information representing images which at least partially overlap and contain a common element of the object; a memory storage unit for storing the information; a coefficient calculation unit connected to the memory storage unit for determining correction coefficients based upon a relationship between corresponding portions of information representing the common element in the images; and an image correction unit for correcting distortion aberration in the images according to the correction coefficients.

According to a fourth aspect of the current invention, a recording apparatus for correcting distortion aberration, includes: an optical unit having an optical axis for focusing upon an object and generating information including images which at least partially overlap and contain a common element of the object, the information also including image correction data; an image storage unit connected to the optical unit for storing the images; a correction information table connected to the optical unit for containing image correction data in correcting distortion aberration in the images; and an image correction unit connected to the correction information table and the image storage unit for correcting distortion aberration in the images according to the correction data.

According to a fifth aspect of the current invention, a system for correcting distortion aberration includes: a memory storage unit for storing information representing images which at least partially overlap and contain a common element of an object; a pattern recognition unit connected to the memory storage unit for extracting a portion of the information corresponding to the common element from each of the images; and a coefficient calculation unit connected to the memory storage unit for determining correction coefficients based upon a relationship between the corresponding portions of the information representing, the correction coefficients including a first coefficient A and a second coefficient B used in the equation, $f(\Phi)=1-A\Phi^2+B\Phi^4$ where $\Phi$ is an angle representing the relationship of the common element in the images.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 3:
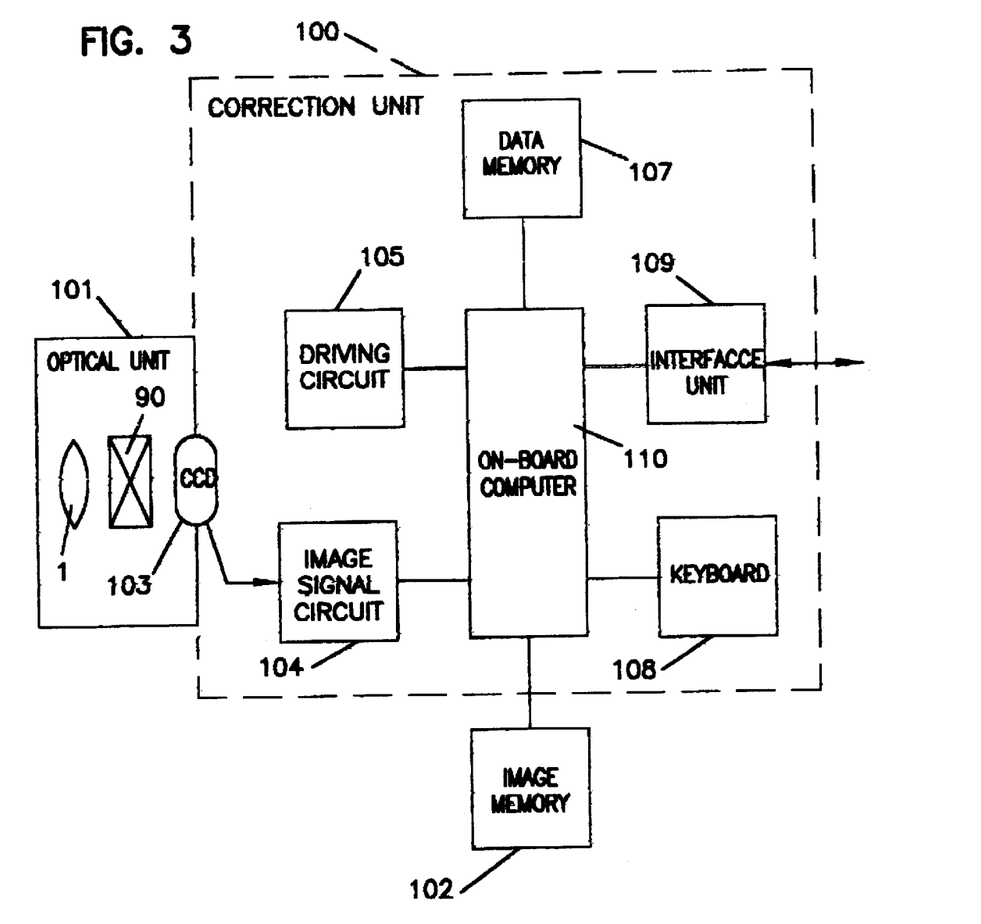
FIG. 3 diagrammatically illustrates one preferred embodiment of the current invention.

Referring now to the drawings, wherein like reference numerals designate corresponding structure throughout the views, and referring in particular to FIG. 3, one preferred embodiment of the image capturing input device or the image recording device according to the current invention includes an optical unit 101 and a correction unit 100 for correcting distortion aberration in the optical unit 101. One example of the image capturing device is a digital camera. The optical unit 101 further includes at least a lens unit 1 and a lens positioning unit 90 for positioning the lens 1 at a desired distance with respect to an object to be imaged.

Still referring to FIG. 3, the image correction unit 100 further includes an image capturing unit 103 such as a charge-coupled device (CCD), a driving circuit 105 for driving the optical unit 101 and an image signal circuit 104 for initially processing image data received from the CCD 103. The image signal circuit 104 performs any combination of an analog-to-digital (A/D) conversion, a gamma conversion and amplification of the image data. An on-board central processing unit (CPU) 110 controls the driving circuit 105 and receives the image data from the image signal circuit 104. The image data may be stored in an image memory such as a detachable memory card 102 via the CPU 110. The correction unit 100 is interfaced with an external central processing unit or a peripheral device via an interface unit 109. A data memory unit 107 such as a ROM stores predetermined sets of data including a gamma conversion table and other predetermined parameter values as discussed below. These parameters are used in determining coefficient values used in a predetermined function for correcting the distortion aberration in the image data. An on-board key board unit or an input unit 108 is used to input or select a set of parameter data which is later used in correcting the distortion aberration in the image data.

Figure 4:
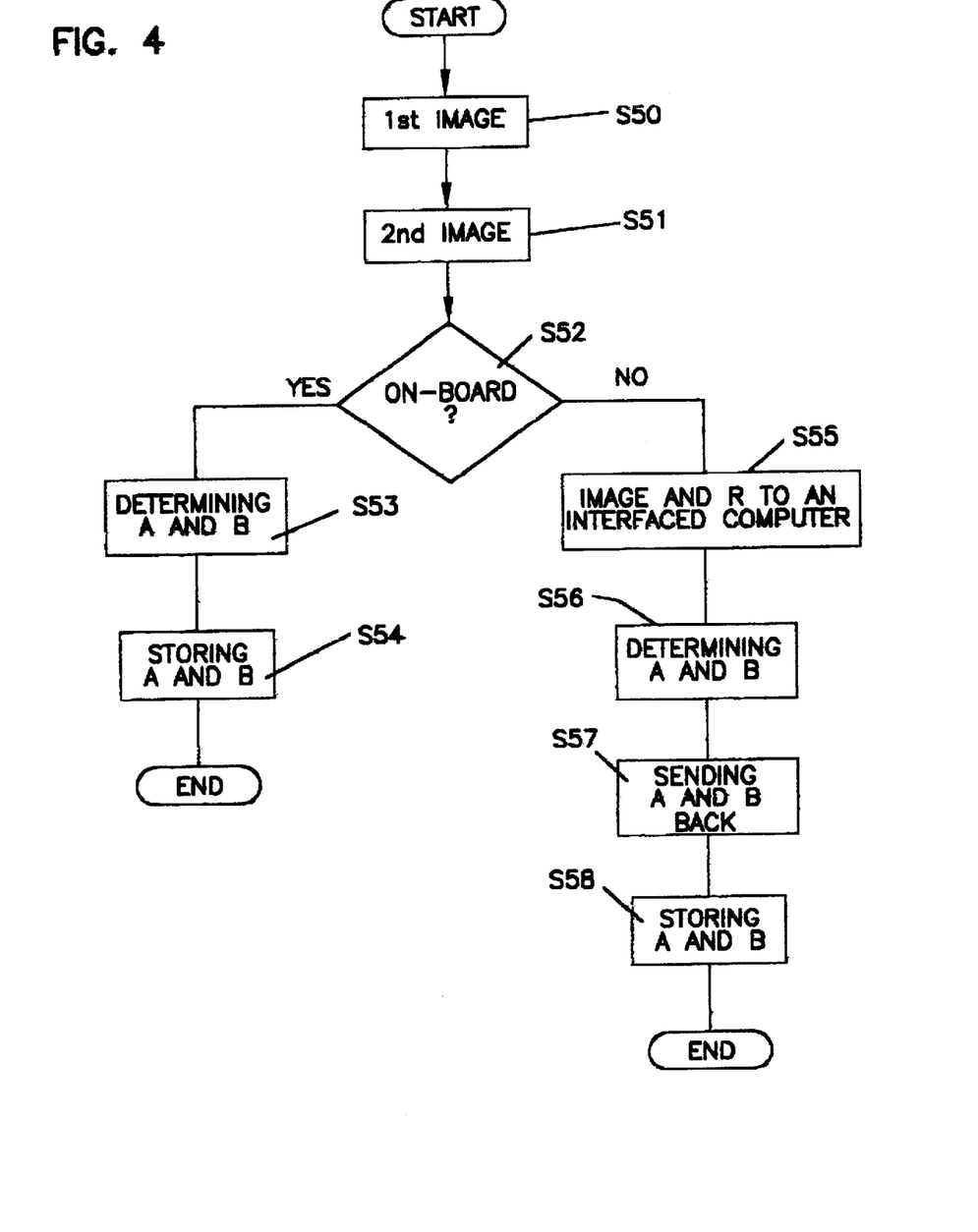
FIG. 4 is a flow chart for illustrating the steps of operation in the preferred embodiment according to the current invention.

Referring to FIG. 4, a flow chart illustrates a series of actions taken for determining the coefficients so as to correct the distortion aberration in images. In a step 50, a first image of an object is taken using an optical unit. In a step 51, a second image is taken after the optical unit is rotated by changing the angle of the optical axis with respect to the object but without changing a distance from the object. In the alternative, in the step 51, the second image is taken by moving the optical unit in parallel to the object without changing the angle and without changing the distance. In either case, the second image is partially overlapping the first image. In other words, the second image contains at least a common element of the same object in the first image. After the above described first and second images are taken, in a step 52, a user decision is made as to whether an on-board computer which is located in the same system for correcting distortion aberration as an optical unit is used for taking the images. If the decision is affirmative, in a step 53, the above described correction coefficients denoted as A and B used in a predetermined function for correcting distortion aberration in the images are determined using the on-board computer, and in a step 54, the coefficients A and B are stored in a memory unit.

Still referring to FIG. 4, when an external computer is to be used, the image data as well as other information such as the above described distance is sent to the external computer via an interface unit in a step 55. In a step 56, the above described coefficients A and B are determined by the external computer, and in a step 57, the coefficient values are sent back to the system for correcting distortion aberration. The coefficients are stored in a data memory in a step 58.

Figure 5:
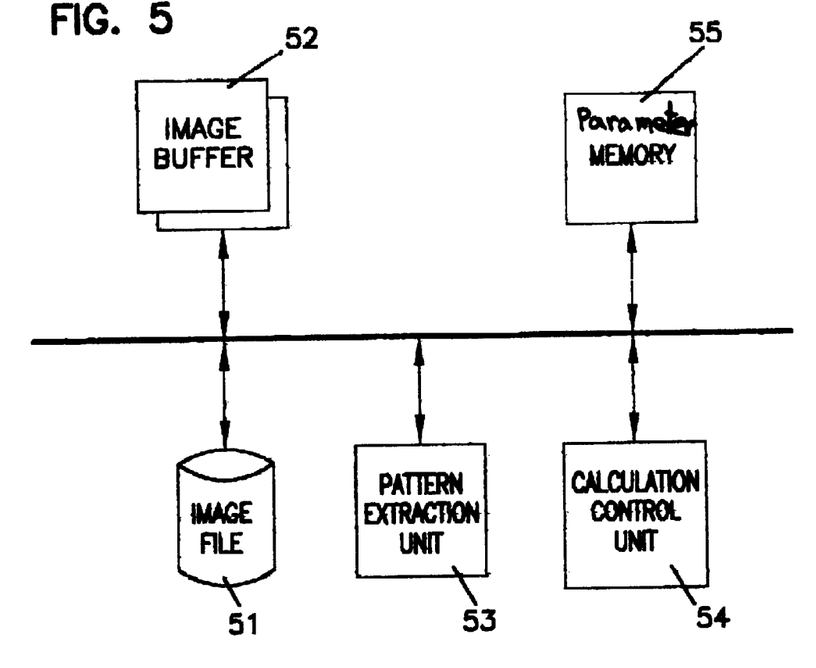
FIG. 5 diagrammatically illustrates a second preferred embodiment according to the current invention.

Referring to FIG. 5, according to another preferred embodiment of the current invention, a system for correcting the distortion aberration includes an image file 51, an image buffer 52, a calculation control unit 54 and a parameter memory 55. The image data file stores image data representing a series of partially overlapping images. The image buffer 52 holds the image data for processing. The pattern extraction unit 53 extracts a common element or pattern from the partially overlapping images before the calculation control unit 54 determines coefficients A and B used in a function which corrects distortion aberration based upon the relationship between a common element in the images. The coefficients A and B are respectively related to a squared and a fourth powered terms in a function which will be described below in reference to equation (4). In addition, the calculation control unit 54 employs certain parameter values stored in the parameter memory 55 during the determination of the coefficients A and B.

Figure 6:
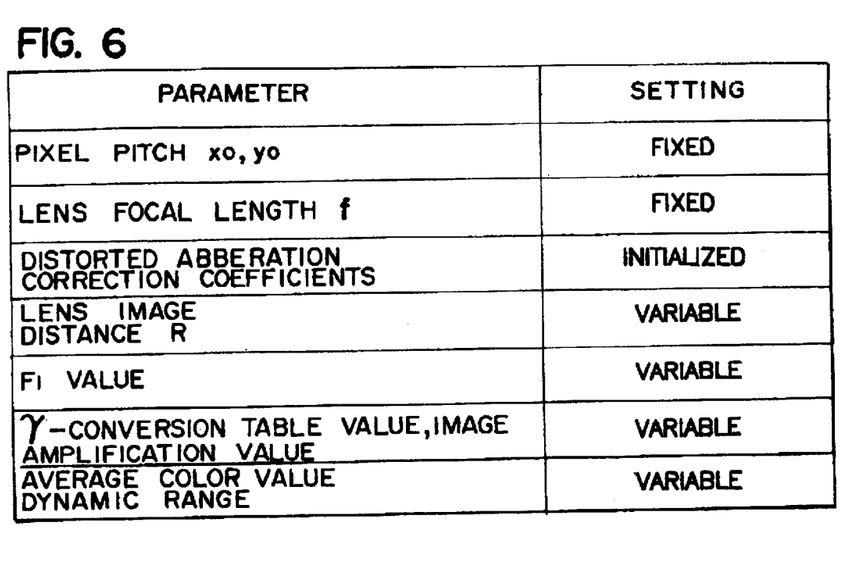
FIG. 6 is a table illustrating exemplary parameters to be used in determining correction coefficients.

Referring to FIG. 6, one exemplary set of the above described parameter data is shown in a table format. The parameter values are used in determining the correction coefficients and include fixed value parameters as well as image captured condition parameters. The fix value parameters are generally predetermined at the time when an optical unit is assembled. Examples of the fixed value parameters include a pixel pitch size Px and Py respectively indicating a distance between pixels such as in a CCD in the horizontal and vertical directions as well as a lens focal length f. On the other hand, the image captured condition parameters are determined when an image is captured. Examples of the condition parameters include a lens-image distance R indicating a distance between the center of the lens and an image-forming surface, a F value indicating luminance, a gamma conversion table value and an amplification value for processing the image data and an average color value or a dynamic range of the image data.

The pixel pitches Px and Py are generally constant. In order to correct the images, the pixel pitches Px and Py correlate image-forming surface coordinates x' and y' to digital coordinates k' and l' as indicated in the equation: (x', y')=(k'·Px, l'·Py). The digital coordinates k' and l' are obtained from positions on an image recording device such as a CCD while image-forming surface coordinates x' and y' are calculated. In the following description of the current invention, the above described digital coordinates are generally used to determine the correction factors or coefficients for correcting the distortion aberration in the images. Since the pixel pitches Px and Py are generally fixed on an image recording device such as a CCD, the pitch information is stored in a memory at the time of the recording device assembly. In the alternative, the pixel pitch information is stored as a part of the image data for each image when a plurality of image-recording devices are used.

The correction coefficients A and B are also generally constant for a lens at a predetermined distance with respect to an object. At a fixed distance, the correction coefficients A and B are substantially the same for the lenses. For this reason, the correction coefficient values are stored in a memory device such as a ROM at the system assembly time according to one preferred embodiment. However, because of slight variations in optical characteristics of each lens, the correction coefficients A and B are initially determined prior to use according to another preferred embodiment. As described above, the correction coefficients A and B are determined using either an on-board computer or an external computer via an interface unit.

Other information is generally determined as the images are taken. For example, the distance R between the image-forming surface and the center of a lens is obtained from a driving unit for positioning a lens with respect to an image-forming surface. Another example includes a gamma conversion table value and an amplification value. Because these values are determined based upon the input image data, the values must be determined for each input image. Since an image-recording device such as a CCD generally does not have a large dynamic range, the range should encompass the range of human perception. For example, shades of one color are coded by eight bits, and the maximal and minimal input values of an image are expressed by the eight bit range while the overall average is color balanced to make the sum of color signals appear monochromatic. In other words, a median value of the luminance distribution lies on a middle of the dynamic range by adjusting the amplification gain value together with the gamma conversion table.

Figure 7:
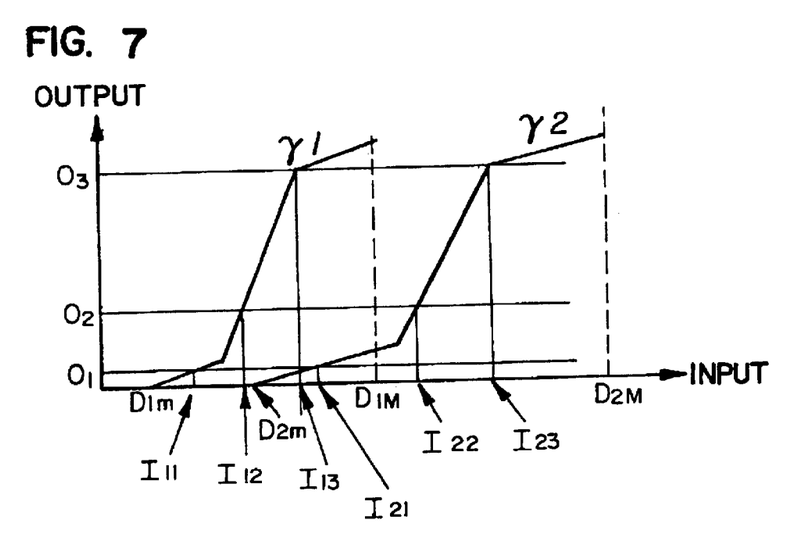
FIG. 7 is a graph illustrating input and output gamma conversion functions.

Referring to FIG. 7, a graph illustrates how a dynamic range affects input reproduction signals. In general, the input signal I is defined by the equation, I=[pixel signal]·[an amplification gain value]. Given three output signals $O_1$, $O_2$, and $O_3$, depending upon a gamma table such as γ1 and γ2 and its associated dynamic range such as D1m_D1M and D2m_D2M, the input reproduction signals are different. The input reproduction signals are used to generate a corrected image and respectively include $I_{11}$, $I_{12}$ and $I_{13}$ for the output signals $O_1$, $O_2$, and $O_3$ when the γ1 table is used and $I_{21}$, $I_{22}$ and $I_{23}$ for the output signals $O_1$, $O_2$, and $O_3$ when the γ2 table is used. Both the gamma conversion table and the amplification value are stored in the above described parameter table. In the alternative, this information is stored in the image data itself. In processing the image data representing a series of partially overlapping images, the above described dynamic range conversion should be applied after the distortion aberration of the images is corrected and the corrected images are joined together to form a single image. In other words, since input values in each of the series of images such as panoramic pictures are different, if each image is treated before joining them, the joined image may not have a uniform appearance. By the same token, the color balancing process should also be applied after the corrected images are joined together into a single image. Color balancing information is stored in a memory device or in each image data.

Figure 8:
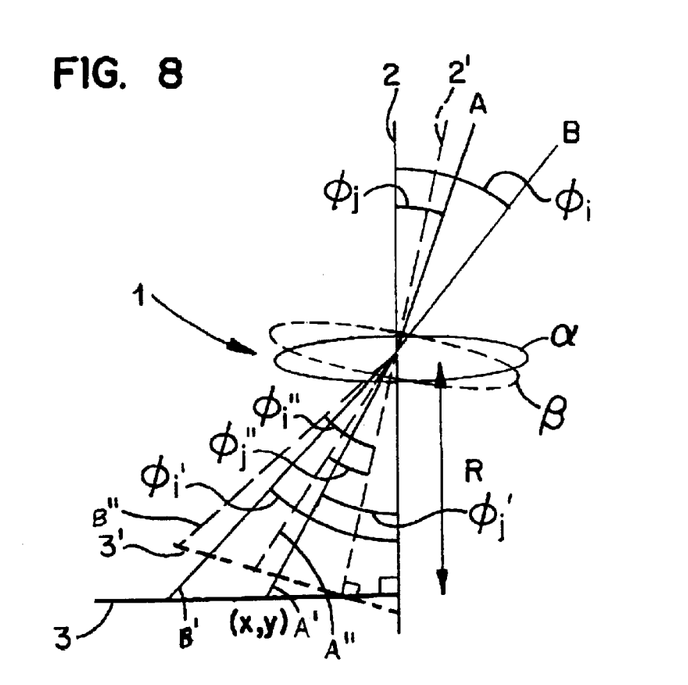
FIG. 8 diagrammatically illustrate how images are formed when a lens is repositioned.

Referring to FIG. 8, in order to determine correction coefficients used in a predetermined function for correcting distortion aberration in images, at least two images are formed through a common lens 1 at two angles with respect to its optical axis 2. According to one preferred process of the current invention, an image input capturing device having the lens 1 such as a camera is employed, and the image input capturing device is moved from an original position in such a manner that an optical axis of the lens at a new position forms a known angle with respect to the optical axis at the original position. To illustrate how the two images are formed in the above described manner, two incoming beams of light A and B reflecting respective objects are shown in solid lines. When the lens 1 is at a first angular position α, the incoming beams A and B exit the lens 1 and project beams A' and B' towards an image forming surface 3. When the lens 1 is moved to a second angular position β as shown in a dotted line, the incoming beams A and B now exit the lens 1, and beams A" and B" as shown in dotted lines are projected towards an image forming surface 3'. An arrow R indicates a distance between a center of the lens 1 and the image forming surface.

Still referring to FIG. 8, the above described light beams form certain angles with respect to an optical axis. The beams A and B respectively form angles $\phi_j$ $\phi_i$ with respect to the optical axis 2. The exited beams A' and B' respectively form angles $\phi_j'$ and $\phi_i'$ with respect to the optical axis 2 when the lens 1 is at the first position α. Similarly, the exited beams A" and B" respectively form angles $\phi_j''$ and $\phi_i''$ with respect to the optical axis 2' when the lens 1 is at the first position β. The above described angles $\phi_i'$, $\phi_j'$, $\phi_i''$ and $\phi_j''$ are measured values. The above measured values are not true values and generally include errors due to distortion aberration of the lens 1.

For the purposes of the current invention, the true values are defined as values that are free from the effect of distortion aberration of a lens and are denoted by $\phi$. In contrast, approximated true values are denoted by $\phi_{i0}'$, $\phi_{j0}'$, $\phi_{i0}''$ and $\phi_{j0}''$ and calculated based upon the measured values $\phi_i'$, $\phi_j'$, $\phi_i''$ and $\phi_j''$. In other words, the true value $\Phi$ is related to an approximated value $\Phi'$ as described by the following equation:

$$\Phi' = \Phi f(\Phi) \tag{3}$$

The function f in the equation (3) for converting a true value to an approximated distortion value is expressed as follows:

$$f(\Phi) = 1 - A\Phi^2 + B\Phi^4 \tag{4}$$

where A and B are predetermined values or distortion aberration coefficients.

Furthermore, the following squared difference between the true values should be equal without distortion aberration when the lens position is rotated in the above described manner.

$$(\Phi_{io}' - \Phi_{jo}')^2 = (\Phi_{io}'' - \Phi_{jo}'')^2 \tag{5}$$

However, the sum of the difference between the right side and the left side of the equation (5) as expressed below is used as an evaluation function:

$$E = \Sigma i,j\{(\Phi_{io}' - \Phi_{jo}'')^2\} \tag{6}$$

where E is a minimum error value because the above described equations (3) through (6) are expressed in terms of angle, the relationship between the angle values and the coordinate values is described below:

$$\sqrt{x^2 + y^2} = R \tan(\Phi') \tag{7}$$

where R indicates a distance between a center of the lens and the image forming surface while x and y respectively indicate coordinates. Based upon measuring multiple pairs of the x and y coordinate values and the R value, $\phi_{i0}'$, $\phi_{j0}'$, $\phi_{i0}''$ and $\phi_{j0}''$ and values are determined, and these approximated true values, in turn, determine A and B.

As an alternative process according to the current invention, the image input capturing device or an optical system is moved in parallel to an object without rotation. For the alternative process, the equations (5) and (6) are respectively expressed in the equations (8) and (9) as follows:

$$(X_{io}' - X_{jo}')^2 = (X_{io}'' - X_{jo}'')^2 \tag{8}$$

where $X_{io}'$, $X_{jo}'$, $X_{io}''$ and $X_{jo}''$ are respectively a corresponding X coordinate of the beam position on an image forming surface. However, the sum of the difference between the right side and the left side of the equation (8) as expressed below is used as an evaluation function:

$$E = \Sigma i,j\{(X_{io}' - X_{jo}'')^2\} \tag{9}$$

The current invention is not limited to either of the above described movements of the image capturing device but also includes a combination of the movements.

Figure 9:
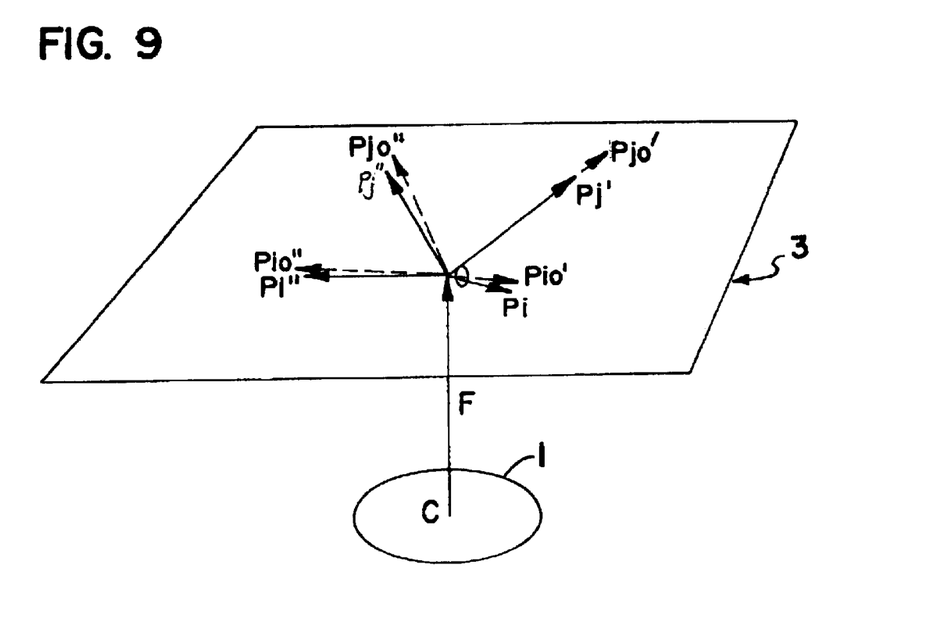
FIG. 9 is a diagram illustrating the effect of the lens movement on the images.

In order to determine correction coefficients for correcting distortion aberration in the images, a separate process is performed based upon how images are generated. Assuming that at least a pair of partially overlapping images have been recorded in the above described manner and a common element or the corresponding portions in the images have been identified, if corresponding pixels in the common element are located along an optical axis of the lens used to form the images, the correction process is performed in one dimension. On the other hand, if the corresponding pixels in the common element are not located along an optical axis of the lens used to form the images, the correction process is performed in two dimensions. Referring to FIG. 9, a flat image forming surface 3 shows the corresponding point locations of the images as a result of the lens movement. Point $P_i'$ corresponds to point $P_i''$ after the lens 1 has been moved by rotating the direction without changing a distance to an object. Similarly, point $P_j'$ corresponds to point $P_j''$ after the lens 1 has been moved. In contrast, points $P_{io}'$, $P_{io}''$, $P_{jo}'$ and $P_{jo}''$ respectively represent correct or true locations (i.e., without distortion aberration) of the corresponding points $P_i'$, $P_i''$, $P_j'$ and $P_j''$. For purposes of the illustration, distortions in the direction are overly exaggerated.

Figure 10:
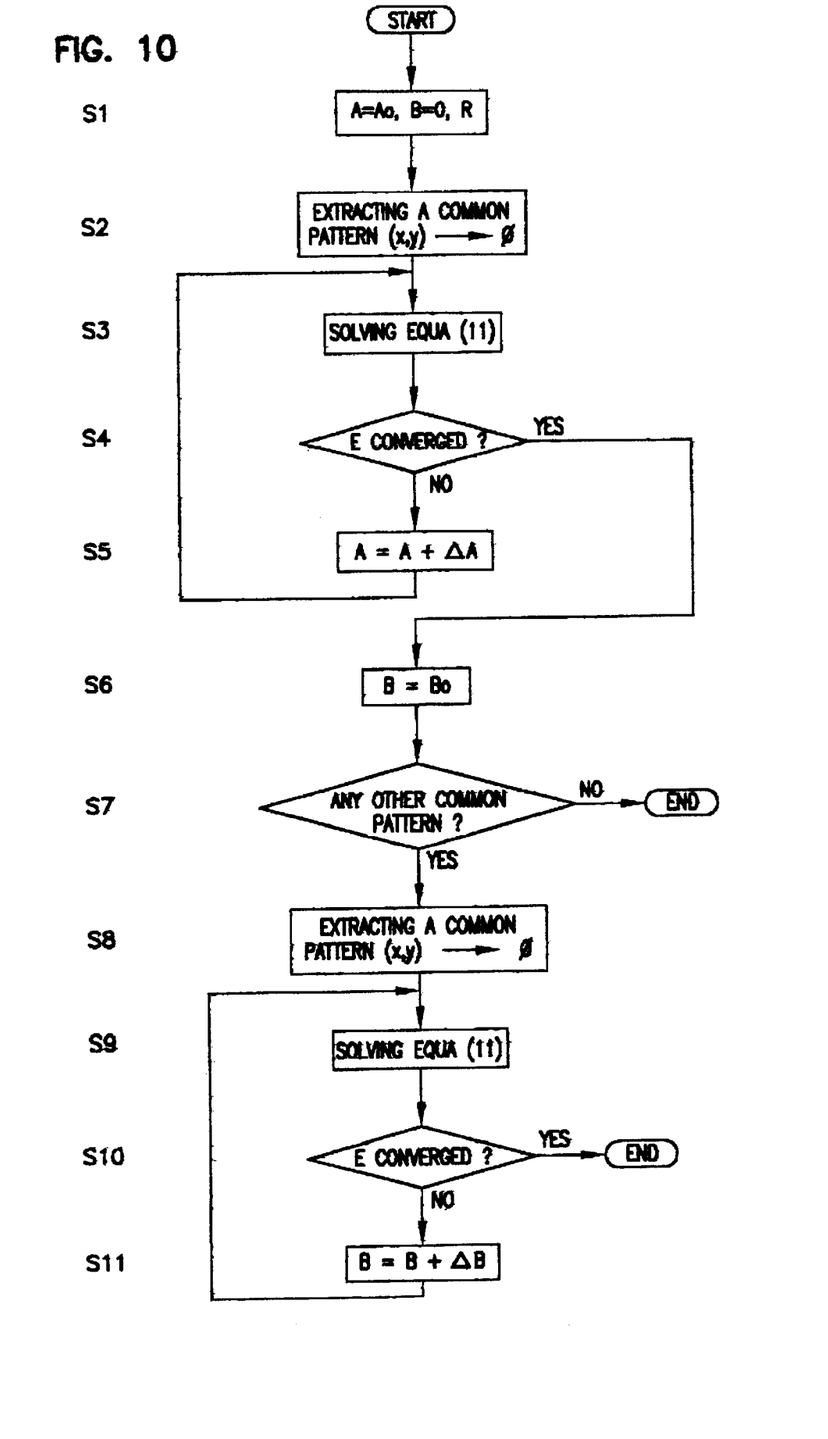
FIG. 10 is a flow chart illustrating the steps for determining correction coefficients according to the current invention using image data collected during one dimensional movement.

In the case of one dimension, the distortion aberration correction coefficients A and B are determined as illustrated in a flow chart of FIG. 10. In a step S1, coefficients A and B are respectively initialized to a predetermined number $A_0$ and 0. Similarly, a distance R between a lens and an image forming surface is set to a known value. In a step S2, from each of at least two images, a portion including a common pattern is extracted. Within the common pattern portion, two pairs of corresponding pixels are selected from the two images. The two pairs of the pixels are denoted as (Pi', Pi") and (Pj', Pj"). Since the two images are moved in one dimension, the above corresponding pixels are located on an optical axis at (xi', yi') and (xi", yi"). Still in the step 2, the above selected two pairs of the pixel coordinates are converted into angles using the following general equation (10):

$$\sqrt{x^2 + y^2} = R \tan(\Phi') \tag{10}$$

Applying the above coordinates to the above equation (10) yields:

$$\Phi i' = \arctan(\sqrt{xi'^2 + yi'^2}/R)$$

$$\Phi i'' = \arctan(\sqrt{xi''^2 + yi''^2}/R)$$

$$\Phi j' = \arctan(\sqrt{xj'^2 + yj'^2}/R)$$

$$\Phi j'' = \arctan(\sqrt{xj''^2 + yj''^2}/R)$$

In a step S3, by substituting the above obtained values $\Phi i'$, $\Phi i''$, $\Phi j'$ and $\Phi j''$ into the following equation (11):

$$\Phi' = \Phi - A\Phi^3 + B\Phi^5 \tag{11}$$

The above equation (11) is obtained by substituting the equation (5) into the equation (3). As described in the step S1, since the coefficient B is 0, the above equation (11) is now $A\Phi^3 - \Phi + \Phi' = 0$. In order to solve this equation, the following p and q are introduced:

$$p = -1/(3A), \quad q = \Phi'/(2A)$$

Furthermore, using the above defined variable, the following equation set (12) is defined as follows:

$$s = q^2 + p^3$$
$$u = \{-q + \sqrt{s}\}^{1/3}$$
$$v = \{-q - \sqrt{s}\}^{1/3} \quad (12)$$

The solution for the above equation set (12) are obtained as follows:

$$\Phi_1 = u + v$$
$$\Phi_2 = -(u+v)/2 + i\sqrt{3}(u-v)/2$$
$$\Phi_3 = -(u+v)/2 - i\sqrt{3}(u-v)/2 \quad (13)$$

However, since only real numbers are used, it is only necessary to consider a solution Φ1 in the above equation (13). In order to determine the error of the solution Φ1, the equation (6) is used and the following evaluation equation is obtained:

$$E = 4\Sigma i,j\{((-\theta io')^{1/3} - (-\theta jo')^{1/3})^2 - ((-\theta io'')^{1/3} - (-\theta jo'')^{1/3})^2\}^2 \quad (14)$$

When solutions θ' and θ" which correspond to the measured values Φ' and Φ" in the equation (11) are used, the parameter or correction coefficient A is expressed in terms of the measured coordinates (x', y') and (x",y"). In other words, E in the equation (11) is a function of the coefficient A. Thus, from the equation (11), $\partial E/\partial A$ as well as $\partial E/\partial AB$ is obtained.

Still referring to FIG. 10, in a step S4, it is determined whether the error value E in the equation (14) substantially converges. If the error value E does not substantially converge, in a step S5, the coefficient A value is adjusted by adding ΔA to the current coefficient value, and ΔA is obtained from the relation $\Delta E = (\partial E/\partial A) \Delta A$. Then, the step S3 is repeated. On the other hand, when it is determined that the error value E substantially converges in the step S4, the correction coefficient value A is also determined. In order to determine a value of the correction coefficient B, in a step S6, the correction coefficient B is now initialized to $B_0$.

In a step S7, it is determined if there exists another common pattern or portion between the two images as similarly decided in the above described Step 2. If there in no additional common pattern, the value of the correction coefficient B is determined to be $B_0$. On the other hand, if the additional common patter exits, two pairs of corresponding pixels are selected from the two images, and steps comparable to the above described step S3 through step S5 for correction coefficient A are repeated for the correction coefficient B.

The above selected two pairs of pixel coordinates are converted into angles in a step S8 using the above equation (10). In a step S9, the equation (11) is solved, and it is determined whether the error evaluation E is converging in a step 10. In a step 11, the correction coefficient B is adjusted by adding ΔB to the current value of the correction coefficient B, and ΔB is obtained from the relation $\Delta E = (\partial E/\partial B) \Delta B$. The above adjustment is repeated until the E value substantially converges in the step S10.

Figure 11:
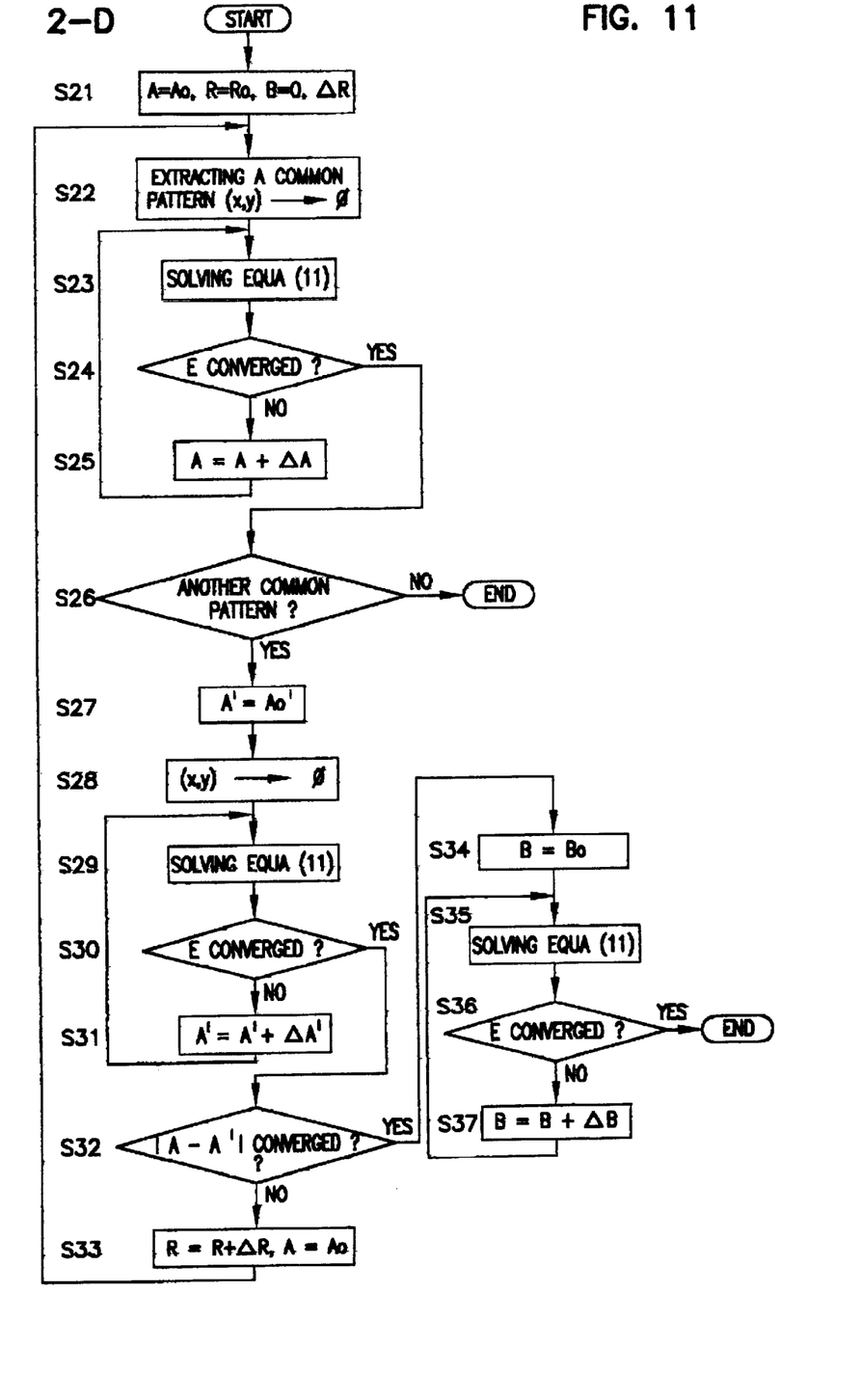
FIG. 11 is a flow chart illustrating the steps for determining correction coefficients according to the current invention using image data collected during two dimensional movement.

Now referring to FIG. 11, a flow chart illustrates one preferred process of determining correction coefficients for image data which is generated by two dimensionally adjusting the optical system. In a step S21, the correction coefficients A and B are respectively initialized to $A_0$ and $D_0$. Similarly, a distance R between the center of a lens and an image forming surface is initialized to $R_0$. In a step S22, from each of at least two images, a portion including a common pattern is extracted. Within the common pattern portion, two pairs of corresponding pixels are selected from the two images. The two pairs of pixels are denoted as (Pi', Pi") and (Pj', Pj") while their coordinates are denoted by (xi', yi') (xi", yi") and (xj', yj') (xj", yj"). Still in the step S22, the above selected two pairs of the pixel coordinates are converted into angles using the above equation (10). In a step S23, equation (11) is solved for $\Phi_{i0}'$, $\Phi_{i0}'$, $\Phi_{j0}''$, and $\Phi_{j0}''$. Using these solution, in a step S24, an error evaluation is performed using the following equation:

$$E = (\angle pjo'Cpio' - \angle pjo''Cpio'')^2 \quad (15)$$

In the alternative, the error evaluation is made based upon the measured coordinates:

$$E = \left( \frac{xio'xjo' + yio'yjo' + R^2}{\sqrt{x'io^2 + y'io^2 + R^2}} - \frac{xio''xjo'' + yio''yjo'' + R^2}{\sqrt{x''io^2 + y''io^2 + R^2}} \right)^2 \quad (16)$$

Until the above E value substantially converges in a step S24, the correction coefficient A is adjusted by repeating steps S23 through S25. In step 25, the first coefficient A value is adjusted by adding ΔA to the current coefficient value, and ΔA is obtained from the relation $\Delta E = (\partial E/\partial A) \Delta A$. After the E value converges, in a step 26, it is determined whether another common pattern exists. If it does not, the process ends. On the other hand, if an additional common pattern exists in the images, in a step 27, a second correction coefficient A' is now initialized to a predetermined value $A_0'$. Steps S28 through S31 are substantially corresponding to the above described steps S22 through S25. In the step S31, a second correction coefficient A' is adjusted by adding ΔA' to the current coefficient value, and ΔA' is obtained from the relation $\Delta E = (\partial E/\partial A') \Delta A'$. The steps S29 through S31 are repeated until the error evaluation value substantially converges in the step S30.

In a step 32, after the first coefficient A and the second coefficient A' are determined, it is determined whether the absolute difference between these coefficients substantially converges. If the difference does not substantially converge, in a step 33, the first coefficient A is again initialized to $A_0$ while the distance R is incremented by ΔR. Following the step S33, the preferred process now starts in the step S22. On the other hand, if the absolute difference converges, the process now moves to a sep 34 where the third coefficient B is initialized to a predetermined value $B_0$. Steps S35 through S37 are comparable to the steps S23 through S25 as well as the steps S29 through S31 and use the values $\Phi_{i0}'$, $\Phi_{i0}'$, $\Phi_{j0}''$, and $\Phi_{j0}''$ determined in the step S28. The third coefficient value B is adjusted until the error evaluation value E substantially converges. Upon the convergence, the coefficients A and B as well as the distance R are all determined.

Figure 12:
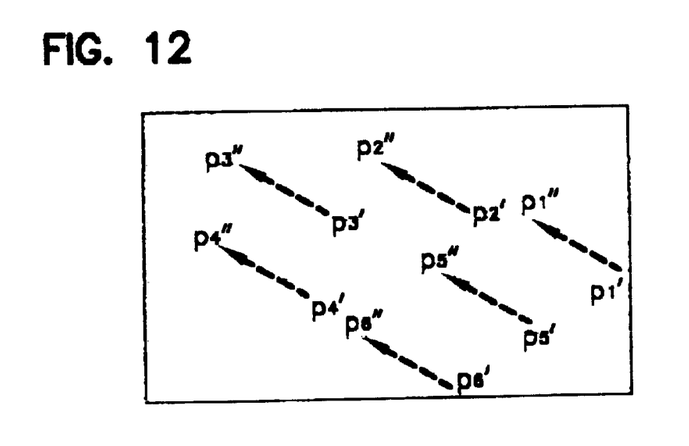
FIG. 12 diagrammatically illustrates vectors indicative of parallel shifts of the images.

Referring to FIG. 12, an alternative method of determining the correction coefficients A and B is based upon the images which are generated without rotating the lens about the optical axis of a lens. Since the distortion aberration of the lens is generally small, under the above condition, when the two partially overlapping images are superimposed, the position of the common elements show a group of vectors S indicating the direction of the positional change of the lens. These vectors S are substantially parallel with each other. Using these vectors in relation to the following relation, $p_{jo}'p_{jo}''//P_{io}'p_ip_{jo}'p_{jo}''//S$, the following equations are derived:

$$(xi'-xi'')/(yi'-yj'')=(xj'-xj'')/(yj'-yj'')=\text{direction }(S)$$

$$(xio'-xio'')/(yio'-yjo'')=(xjo'-xjo'')/(yjo'-yjo'')=\text{direction }(S)$$

The above equations are useful in improving the accuracy in determining the correction coefficients when the lens does not rotate about its optical axis during the image generation. By using this or other improvement techniques, the determination of the correction coefficients is improved by shortening the calculation time and increasing the accuracy. It is also possible to combining these techniques to improve the task or to repeat the task on a series of common patterns. For example, using a facial image, a series of common patterns such as an eye area and a nose area is extracted and prioritized based upon contrast.

For each of these areas, the process for determining the coefficient values is repeated. The results are then used by modifying a criterion or a threshold for error evaluation. Such variable thresholds include a high threshold value for a center portion of the image and a low threshold value for a peripheral portion of the image.

The above described preferred embodiments are directed to images formed on a flat surface. However, the concept of the current invention is applicable to images formed on a curved surface as well as a spherical surface for correcting distortion aberration in the images.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts, as well as implementation in software, hardware, or a combination of both within the principles of the invention to the full extent indicated by the broad general meaning of the terms in which the appended claims are expressed.

What is claimed is:

1. A method of correcting distortion aberration in images taken by a common image-forming optical system having a predetermined optical axis, comprising:

a) taking at least partially overlapping images of an object using the common image-forming optical system whose predetermined optical axis is placed at a plurality of angles with respect to the object, the images containing a common element of the object, each of the images containing pixels;

b) determining distortion aberration correction regardless of a focal length of the common image-forming optical system based upon an angular relationship between corresponding pairs of the common element in the images with respect to the predetermined optical axis; and c) correcting according to said distortion aberration correction coefficients a distance between each of said pixels and the predetermined optical axis of the images deformed by the distortion aberration.

2. The method of correcting distortion aberration in images according to claim 1 wherein said information includes angular positions.

3. The method of correcting distortion aberration in images according to claim 1 wherein said step a) is performed by taking the images with the optical system placed at positions in parallel to the object.

4. The method of correcting distortion aberration in images according to claim 3 wherein said information includes parallel positions.

5. The method of correcting distortion aberration in images according to claim 1 wherein said correction coefficients include A and B in the following relation:

$$f(\Phi)=1-A\Phi^2+B\Phi^4$$

where $\Phi$ is an angle between the optical axis and the common element in one of the images.

6. The method of correcting distortion aberration in images according to claim 5 wherein said step b) further comprises additional steps of:

d) initializing one of the correction coefficients;

e) determining minimal error values between each of the corresponding pairs of information on the common element in the images;

f) determining if said minimal error value converge to a particular value; and g) upon converging in said step f), repeating said steps e) and f) for another of the correction coefficients.

7. The method of correcting distortion aberration in images according to claim 6 wherein said step b) further comprises additional step of h) repeating said steps e) and f) for determining a focal length upon converging in said step f).

8. The method of correcting distortion aberration in images according to claim 1 further comprising a step of:

i) joining the corrected images so as to generate a composed image.

9. A method of correcting distortion aberration in images taken by a common image-forming optical system, comprising:

j) determining a distortion aberration correction regardless of a focal length of the common image-forming optical system based upon an angular relationship between corresponding pairs of the common element in the images taken by the common image-forming optical system whose predetermined optical axis is placed at a plurality of angles with an object, the images being at least partially overlapping to contain the common element of the object, each of the images containing pixels;

k) correcting a distance between each of said pixels and the predetermined optical axis for distortion aberration in the images according to a predetermined correction function using said distortion aberration correction coefficient; and l) joining the corrected images so as to generate a composed single image.

10. The method of correcting distortion aberration in images according to claim 9 further comprising additional steps of:

m) selecting the common element based upon a predetermined criterion; and n) correlating information on the common element between the images prior to said step j).

11. The method of correcting distortion aberration in images according to claim 10 wherein said predetermined criterion includes a contrast value.

12. The method of correcting distortion aberration in images according to claim 9 further comprising an additional step o) of color balancing the composed image subsequent to said step l).

13. A system for correcting distortion aberration in images, comprising:
- a common image-forming optical unit having an optical axis for focusing upon an object and generating information representing images which at least partially overlap by placing the optical axis at a plurality of angles with respect to the object and contain a common element of the object, each of the images containing pixels;
- a memory storage unit for storing said information;
- a coefficient calculation unit connected to said memory storage unit for determining distortion aberration correction regardless of a focal length of the common image-forming optical unit based upon an angular relationship between corresponding portions of the common element in the images with respect to the optical axis; and
- an image correction unit for correcting a distance between each of the pixels and the optical axis for distortion aberration in the images so as to generate corrected images according to said correction coefficients.

14. The system for correcting distortion aberration in images according to claim 13 wherein said distortion aberration correction coefficients include a first coefficient A and a second coefficient B used in a relation as follows $$f(\Phi)=1-A\Phi^2+B\Phi^4$$

where $\Phi$ is an angle between the optical axis and the common element in one of the images.

15. The system for correcting distortion aberration in images according to claim 13 wherein said information includes angular positions of said images rotated around the optical axis.

16. The system for correcting distortion aberration in images according to claim 13 wherein said information includes parallel positions of said images taken in parallel to the object.

17. The system for correcting distortion aberration in images according to claim 14 wherein said coefficient calculation unit performs the steps of:
- i) initializing one of the distortion aberration correction coefficients;
- ii) determining a minimal error value between each of the corresponding portions of information on the common element in the images;
- iii) determining if said minimal error value converging; and
- iv) upon converging in said step iii), repeating said steps ii) and iii) for another of the distortion aberration correction coefficients.

18. The system for correcting distortion aberration in images according to claim 17 wherein said coefficient calculation unit performs said steps ii) and iii) for determining a focal length upon converging in said step iii).

19. The system for correcting distortion aberration in images according to claim 13 wherein said image correction unit joins a plurality of said corrected images so as to generate a composed image.

20. A recording apparatus for correcting distortion aberration, comprising:
- a common image-forming optical unit having an optical axis for focusing upon an object and generating information including images which at least partially overlap by placing the optical axis at a plurality of angles with respect to the object and contain a common element of the object, said information also including distortion aberration correction data, each of the images containing pixels;
- an image storage unit connected to said optical unit for storing said images;
- a correction information table connected to said optical unit for containing said distortion aberration correction data in correcting distortion aberration regardless of a focal length of said common image-forming optical unit in the images based upon an angular relationship between corresponding portions of the common element in the images with respect to the optical axis; and
- an image correction unit connected to said correction information table and said image storage unit for correcting according to said distortion aberration correction data a distance between each of said pixels and the optical axis for distortion aberration in the images.

21. The recording device for correcting distortion aberration according to claim 20 further comprising an interface unit connected to said image storage unit and said correction information table for providing access to said distortion aberration correction data and said images through a predetermined interface.

22. The recording device for correcting distort aberration according to claim 20 wherein said distortion aberration correction data includes a predetermined correction coefficient which corrects a relationship between corresponding portions of information on the common element in the images.

23. The recording device for correcting distortion aberration according to claim 20 wherein said distortion aberration correction data includes information which is updated when said images are generated.

24. The recording device for correcting distortion aberration according to claim 20 wherein said image correction unit color balances said images.

25. A system for correcting distortion aberration comprising:
- a memory storage unit for storing information representing images which at least partially overlap and contain a common element of an object;
- a pattern recognition unit having an optical axis connected to said memory storage unit for extracting a portion of the information corresponding to the common element from each of the images; and
- a coefficient calculation unit connected to said memory storage unit for determining distortion aberration correction coefficients based upon a relationship between said corresponding portions of the information representing said distortion aberration correction coefficients including a first coefficient A and a second coefficient B used in $f(\Phi)=1-A\Phi^2+B\Phi$ where $\Phi$ is an angle representing the relationship between the optical axis and the common element in the images.

26. The system for correcting distortion aberration according to claim 25 further comprising a parameter memory connected to said coefficient calculation unit for storing parameter values used in determining said first coefficient A and said second coefficient B.

* * * * *